(12) United States Patent
Zhang et al.

(10) Patent No.: US 11,210,280 B2
(45) Date of Patent: Dec. 28, 2021

(54) SYSTEMS AND METHODS FOR FAST BLOOM FILTER OPERATIONS

(71) Applicant: ALIBABA GROUP HOLDING LIMITED, Grand Cayman (KY)

(72) Inventors: David Zhang, San Mateo, CA (US); Li Zhao, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 122 days.

(21) Appl. No.: 16/431,295

(22) Filed: Jun. 4, 2019

(65) Prior Publication Data

US 2020/0387491 A1    Dec. 10, 2020

(51) Int. Cl.
*G06F 16/00* (2019.01)
*G06F 16/22* (2019.01)
*G06F 16/901* (2019.01)

(52) U.S. Cl.
CPC ...... *G06F 16/2255* (2019.01); *G06F 16/2237* (2019.01); *G06F 16/9014* (2019.01)

(58) Field of Classification Search
CPC ............. G06F 16/2255; G06F 16/2237; G06F 16/9014
See application file for complete search history.

(56) References Cited

U.S. PATENT DOCUMENTS

| | | | | |
|---|---|---|---|---|
| 7,930,547 B2* | 4/2011 | Hao | ...................... | H04L 45/745 713/176 |
| 8,694,703 B2* | 4/2014 | Hans | ....................... | G06F 3/067 710/65 |
| 10,417,233 B2* | 9/2019 | Sabaa | ................... | H04L 67/2842 |
| 10,896,225 B2* | 1/2021 | Nowakiewicz | ........ | G06F 16/221 |
| 2006/0052962 A1* | 3/2006 | Shipton | .................. | H04N 1/405 702/106 |
| 2007/0115986 A1* | 5/2007 | Shankara | ............... | H04L 63/145 370/392 |
| 2008/0155229 A1* | 6/2008 | Beyer | ...................... | G06F 17/10 711/216 |
| 2008/0243941 A1* | 10/2008 | Beyer | ...................... | G06F 17/10 |
| 2011/0307659 A1* | 12/2011 | Hans | ....................... | G06F 3/0613 711/114 |

(Continued)

OTHER PUBLICATIONS

Luo et al. "Optimizing Bloom Filter: Challenges, Solutions, and Comparisons" p. 1-34.

(Continued)

*Primary Examiner* — Jean M Corrielus
(74) *Attorney, Agent, or Firm* — Finnegan, Henderson, Farabow, Garrett & Dunner, LLP

(57) ABSTRACT

A system and method of setting and checking a Bloom filter is provided. The system generates a set of hashed values by applying a number of hash functions to an input value; determines each bit address of a bloom filter corresponding to a hashed value of the set of hashed values; maps each determined bit address from the bloom filter into a corresponding byte address of a register, such that each bit address corresponds to one byte address; writes a byte value into the register for the byte address, wherein each bit of the byte value corresponds to a bit address of the bloom filter and writes each bit of the byte value from the register into the bloom filter for each bit address of the byte address.

14 Claims, 6 Drawing Sheets

(56) References Cited

U.S. PATENT DOCUMENTS

| | | | |
|---|---|---|---|
| 2013/0262472 A1* | 10/2013 | Watanabe | G06F 16/2255 |
| | | | 707/747 |
| 2016/0188392 A1* | 6/2016 | Baghsorkhi | G06F 9/30 |
| | | | 714/819 |
| 2016/0188623 A1* | 6/2016 | Finlay | G06F 16/2255 |
| | | | 707/690 |
| 2018/0181338 A1* | 6/2018 | Tamura | G06F 3/0608 |
| 2019/0266193 A1* | 8/2019 | Wang | G06F 16/9014 |
| 2019/0362026 A1* | 11/2019 | Nowakiewicz | G06F 16/221 |
| 2021/0089591 A1* | 3/2021 | Hanson | G06F 16/2237 |

OTHER PUBLICATIONS

Lyons et al. "The Design of a Bloom Filter Hardware Accelerator for Ultra Low Power Systems" School of Engineering and Applied Sciences, Harvard University, Cambridge, MA, {mjlyons.dbrooks} @eecs.harvard.edu.

\* cited by examiner

SYSTEMS AND METHODS FOR FAST BLOOM FILTER OPERATIONS

BACKGROUND

Numerous organizations, including industry and government entities, operate on increasingly large datasets for a number of applications. Bloom filters may be used to reduce the computing power and time needed to identify whether an element is in a set. However, a Bloom filter only performs a probabilistic test of whether the element may be included in the set. Thus, a test using a Bloom filter can result in false positives.

Currently, the probability of generating a false positive may be tuned based on the number of hashes performed on each key and on the bit vector size (i.e., the memory used). To reduce the error of the Bloom filter, or the rate at which the filter generates false positive results, the number of hashes performed must be increased. However, the increase in hash functions results in additional overhead and may be constrained by the available memory, the number of hashes that can be performed on each key, and the number of keys that must be supported. Thus, current solutions for implementing bloom filters are redundant, for example, requiring several CPU cycles.

SUMMARY

In view of the above problems, embodiments of the present disclosure are proposed to provide a method and a system for checking and setting a Bloom filter that can address the above problems or at least partially solve the above problems.

In accordance with some embodiments of the present disclosure, there is provided a computer-implemented method. The method includes generating a set of hashed values by applying a number of hash functions to an input value. The method includes determining each bit address of a bloom filter corresponding to a hashed value of the set of hashed values. The method includes mapping each determined bit address from the bloom filter into a corresponding byte address of a register, such that each bit address corresponds to one byte address. The method includes writing a byte value into the register for the byte address, wherein each bit of the byte value corresponds to a bit address of the bloom filter. The method includes writing each bit of the byte value from the register into the bloom filter for each bit address of the byte address.

In accordance with some embodiments of the present disclosure, there is provided a computer-implemented method. The method includes generating a set of hashed values by applying a number of hash functions to a search value. The method includes determining each bit address of a bloom filter corresponding to a hashed value of the set of hashed values. The method includes mapping each determined bit address from the bloom filter into a corresponding byte address of a register, such that each bit address corresponds to one byte address. The method includes writing a byte value into the register for the byte address, wherein each bit of the byte value corresponds to a bit address of the bloom filter. The method includes fetching a database segment associated with each byte address. The method includes for each database segment, checking a portion of the database segment corresponding to the bit addresses associated with the set of hashed values to determine whether the portion contains the search value.

In accordance with some embodiments of the present disclosure, there is provided a system. The system includes a memory configured to store a bloom filter having byte addresses and corresponding bit values. The system includes a configurable register configured to store a set of hash values that are generated by applying a number of hash functions to an input value, where the set of hash values are used to determine corresponding bit addresses of the bloom filter. The configurable register may be configured to read the determined corresponding bit addresses from the bloom filter and to store byte values wherein each bit of the byte values corresponds to a bit address of the bloom filter.

BRIEF DESCRIPTION OF THE DRAWINGS

Reference will now be made to the accompanying drawings showing example embodiments of the present application, and in which.

DETAILED DESCRIPTION OF EXEMPLARY EMBODIMENTS

Figure 1:
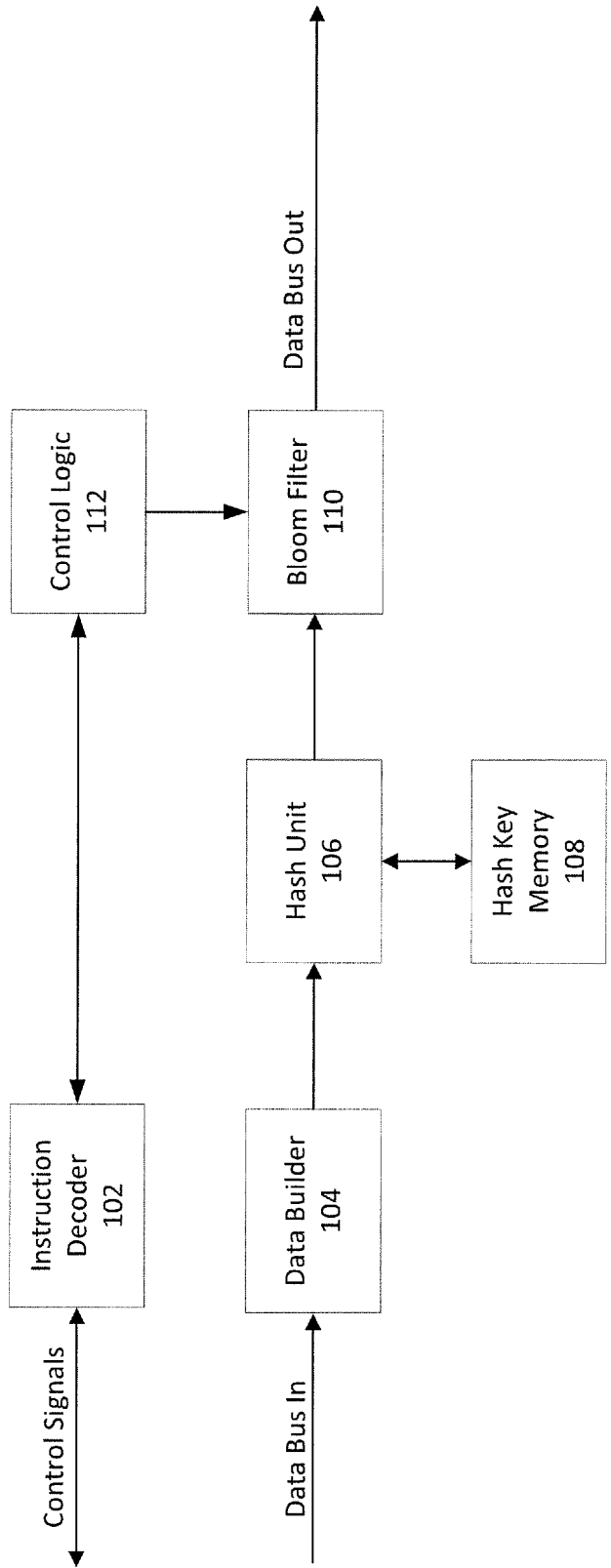
FIG. 1 illustrates an exemplary system for implementing a Bloom filter, consistent with some embodiments of the present disclosure.

Reference will now be made in detail to the embodiments, examples of which are illustrated in the accompanying drawings. Whenever possible, consistent reference numbers will be used throughout the drawings to refer to the same or like parts.

As used herein, a Bloom filter may refer to an approximate encoding of a set of items or keys using a bit array, such as an array data structure that compactly stores bits. When the array is initiated, each bit is set to an initial value of 0. To insert an item into the bit array, the item is hashed to a number between 1 and b, b being the number of bits held by the bit vector. The results of the hash functions correspond to addresses in the bit array, which are then set to 1.

To check if an item is in the Bloom filter, the item is hashed the same number of times as the items inserted into the Bloom filter. For example, if each inserted item was hashed b times, the item being checked is hashed b times. The addresses corresponding to the hash results are checked and if any of the hash functions points to a 0 bit, then the item is not in the set, with 100% certainty. However, if a hash function points to a 1 bit, then either: i) the item is present in the Bloom filter; or ii) the hashed value of this item collided with the hash value of some other item that is in the Bloom filter. Because of hash collisions, a Bloom filter can produce false positives, i.e., the item is falsely reported as being in the Bloom filter. However, a Bloom filter never produces false negatives, i.e., the item is in the Bloom filter, but its presence is not reported.

To reduce the frequency of false positives, the number of hashes used by the Bloom filter may be increased, such that the greater the number of hash functions, the lower the rate of false positives. However, as the number of hash functions increases, the process to set and check items in the Bloom filter becomes more computationally costly. One method of accelerating setting and checking operations may be to execute operations in parallel. However, CPUs operate on bits, which results in a bucketing problem, for example, when multiple bits need to be operated on, but the multiple bits belong to the same byte. Thus, when run in parallel, operations may encounter read/write issues.

Embodiments described herein solve problems of accelerating Bloom filters to answer existence questions in a number of applications. For example, some conventional systems use Bloom filters to reduce the disk lookups for non-existent rows or columns. Avoiding disk lookups considerably increases the performance of a database query operation. For example, in some databases, each database file storing a set of rows has an associated Bloom filter. While executing a database query, Bloom filters may be checked first, obviating the need to query a database where the Bloom filter has indicated that one or more items of the set are definitely not present. Most of the Bloom filters will return false for a membership query, while the few that return true will result in heavier IO operations to traverse database file contents (such as index data and row data).

In one example, Lindorm, a big data on-line NoSQL distributed storage system developed by Alibaba, uses Bloom filters for both disk lookups and memstore lookups. As used herein, memstore refers to an in-memory data structure that holds a portion of the overall data stored in the storage system. Since memstore capacity is smaller than on-disk storage, memstore can suffer from high-lookups miss rates. Bloom filters may help to quickly reject these lookups, eliminating the cost of traversing memstore data.

As used herein, memstore refers to a memstore capacity, which is a small fraction of the on-disk storage capacity. Memstore capacity may be, for example, one to ten gigabytes, while on-disk storage may be, for example, on the order of terabytes or petabytes. When looking up a particular piece of data, e.g. User=Alice, the result may exist in memstore or in on-disk storage. Due to the large size of on-disk storage, data are more often found in on-disk storage and are less likely to be found in memstore. Memstore suffers high look up miss rates because it stores a small amount of data in comparison with on-disk storage, yet must be checked for each lookup.

In another example, Bloom filters may be used in analytical databases (OLAP) for performing joins between tables that have disproportionately different cardinalities. A Bloom filter may be built with the keys from the smaller of the tables. The keys of the larger table may be checked with the filter to discard the keys that do not match. In distributed query execution, Bloom filters may be used to filter tuples before sending them over the network. The process of filtering across tables, approximately or not, is referred to as a semi-join.

To improve the effectiveness of a Bloom filter, conventional approaches usually hash each item in a set several times with independent hash functions, depending on the desired false positive rate. For example, a Bloom filter may use k hash functions. To encode an item x, the k bits in a bit array that correspond to $h_i(x)$ for $1 \leq i \leq k$ are set to 1, where $h_i(x)$ is the hash function applied to x for each of the k bits. In some embodiments, the hash function may result in a bit address that has been picked a number of times.

To check if item y is a member of the set, item y is hashed k times using the same hash functions previously used by the Bloom filter when setting item x. The bit corresponding to $h_i(x)$ is examined to determine whether it is set to 1 for all $1 \leq i \leq k$. If any of the k bits are not set, or contain a value of 0, then y cannot be a member of the set; otherwise, if all k bits have a value of 1, then item y is either in the set or the process has yielded a false positive.

Current solutions often use software to set or check elements sequentially, which is inefficient and requires looping through software instructions over many CPU cycles. Due to this inefficiency, memstore cannot be used for certain workloads and scenarios. Specifically, the current software and sequential approach can only be used for memstore with high lookup-miss rates. Disclosed embodiments implement Bloom filters with hardware-assistance to enable filtering on more workloads, thereby improving the efficiency of the Bloom filters by accelerating the speed at which the Bloom filter is executed. Disclosed embodiments include instructions and control logic to increase the speed of the setting and checking operations of Bloom filters. For example, unlike traditional software for implementing a Bloom filter, disclosed embodiments evaluate k bits at a time, rather than bit by bit. Disclosed embodiments may be used in a number of computing applications such as cloud computing including database and storage, etc.

Due to the inefficiency of sequentially setting or checking elements, Bloom filters cannot be used for certain workloads. For example, if a workload consists of only writes, a bloom filter adds overhead without improving functionality. In another example, if a workload looks up recently inserted data, which is often found in memstore, then a bloom filter is ineffective because it cannot reject lookups to on-disk storage.

FIG. 1 an exemplary computing system 100 for implementing a Bloom filter, consistent with some embodiments of the present disclosure. System 100 may operate on k bits at a time as a bulk process, rather than bit-by-bit, thereby accelerating setting and checking operations using Bloom filters. Additionally, system 100 may implement a number of Bloom filters in parallel, rather than sequentially. Many current systems use a sequential approach, requiring several CPU cycles to traverse memstore data. By combining bit operations into a single instruction (e.g., AVX instruction), system 100 may implement a number of Bloom filters in parallel, rather than sequentially using several CPU cycles.

The system 100 may include an instruction decoder 102 for receiving control signals from a processor. For example, control signals may include one or more parameter values for varying the number of hashes used by the Bloom filter or varying the size of the hash value (e.g., whether the size of the hash value involves 1, 2, or 4 bytes), as will be discussed in further detail below. The instructions received by instruction decoder 102 allow system 100 to operate using bit-specific instructions tailored for bit-wise operation, thereby accelerating setting and checking operations.

The system 100 may receive input data via Data Bus In. In some embodiments, input data may be received at a data builder 104 configured to combine one or more input data segments into a segment length required by the Bloom filter. For example, input data may include 16-bit segments for use with a 32-bit hash key. Data builder 104 may combine 16-bit segments into the required 32-bit segments.

In some embodiments, hash unit 106 is configured to manage one or more hash keys. Hash unit 106 may implement one or more hash functions and is configurable via instruction decoder 102. In some embodiments, the system 100 may include a number of hash units, each hash unit being associated with a Bloom filter accessing a particular database. Thus, each Bloom filter may be independently configurable. In some embodiments, hash key memory 108 may store one or more hash functions for use with each Bloom filter. For example, a stored hash function may map data of an arbitrary size to data of a fixed size. In some embodiments, a hash function may arbitrarily size keys to integer values. In some embodiments, instruction decoder 102 may provide a desired number of hash functions for a Bloom filter to use based on a user's desired false positive rate.

In some embodiments, hash key memory 108 may be a configurable register configured to store a set of hash values, e.g., hash values generated by hash unit 106. For example, hash key memory 108 can be a vector extension register (e.g., Advanced Vector Extension register (AVX mm256 or mm512 register)) of a processor, configured to hold an address array. Some AVX instructions may be used to implement Bloom filter functionality. However, these instructions can be cumbersome and not user friendly. Disclosed embodiments reduce the complexities associated with AVX instructions, thereby resulting in a fast and straightforward method that may be easily adopted by software programmers. As an example, an mm256 register may be configured by control logic 112 to hold either 32, 16, or 8 hashed values, which may be tuned, via instruction decoder 102, depending on the requirements, e.g., required false positive rate. In some embodiments, control logic 112 may store an immediate value, which may be used to indicate the size of each hashed value in bytes. For example, using mm256 register to hold the address array, the size of the register will be 32, 16, or 8 for immediate values of 1, 2, or 4, respectively.

In some embodiments, control logic 112 can be used to configure Bloom filter 110 and may receive instructions from instruction decoder 102. In some embodiments, a hashed value of 4 bytes may be used for a Bloom filter with a maximum size of $2^{32}$ that contains 4G bits. However, the immediate value provides the flexibility for system 100 to operate a smaller Bloom filter, for example, a Bloom filter with a maximum size of $2^{16}$ bits, thereby speeding up the processing of a checking operation. The immediate value may be modified based on the specific requirements for the Bloom filter. For example, instruction decoder 102 may receive an immediate value and pass this value to control logic 112 for setting the Bloom filter 110.

In some embodiments, a number of systems, e.g., system 100, may be connected in parallel to perform operations simultaneously. In such embodiments, the respective Bloom filter memories of each system may be connected to a multiplexer to combine the outputs into a single output stream. In another embodiment, the parallel systems may be connected to a data compressor either in addition to or instead of a multiplexer.

Figure 2:
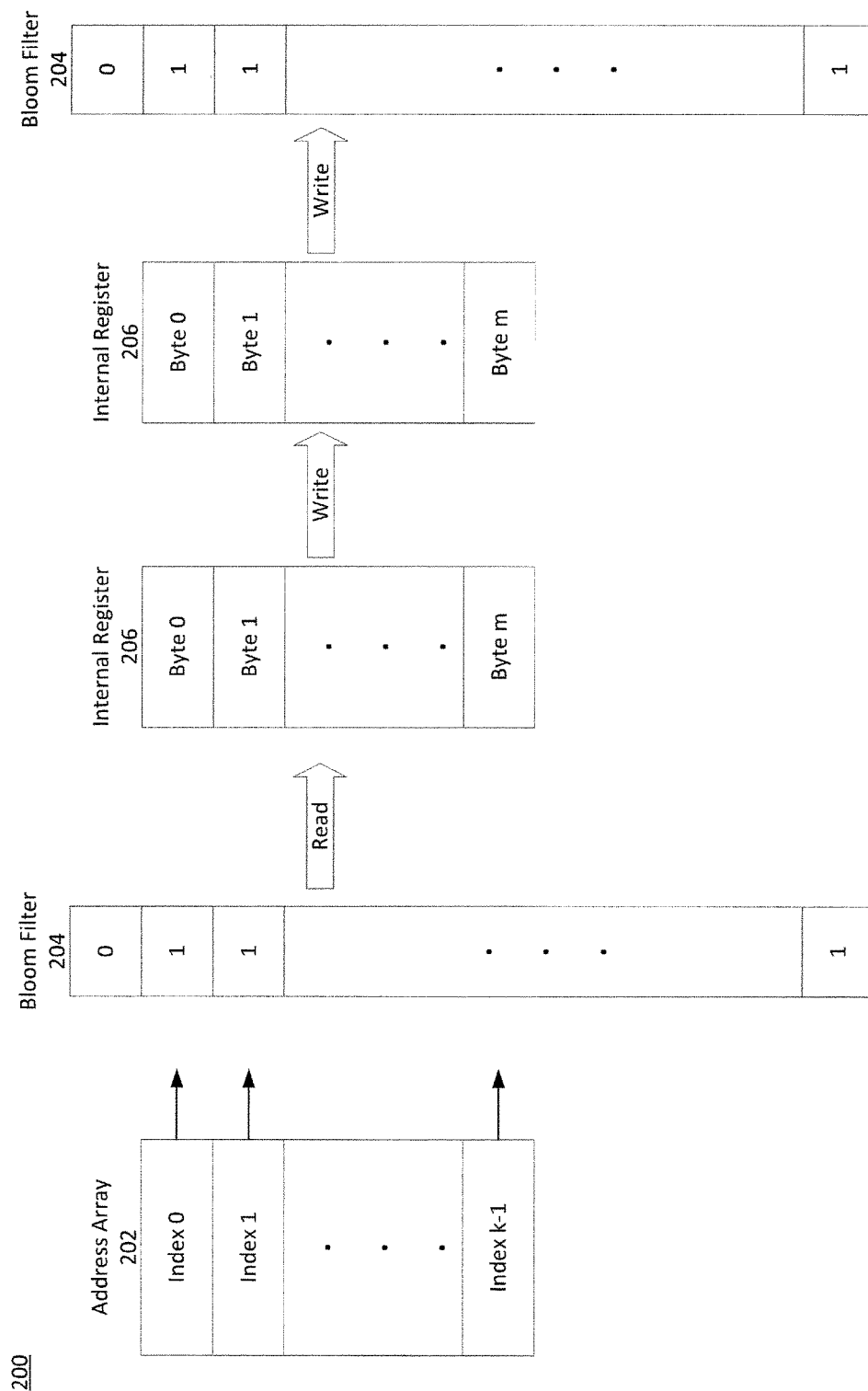
FIG. 2 illustrates an exemplary setting process for a Bloom filter, consistent with some embodiments of the present disclosure.

FIG. 2 illustrates an exemplary setting operation 200 using a Bloom filter, e.g., Bloom filter 110, or a series of parallel Bloom filters, consistent with some embodiments of the present disclosure. Setting operation 200 may be executed by one more Bloom filter systems, e.g., system 100, arranged in parallel.

System 100 may receive input data via Data Bus In. Hash unit 106 may generate an address array 202 holding k values, where k is the number of hashes performed on each input data item, thereby resulting in k index values. Hash unit 106 may execute the k hash functions on each input data item and store the hashed values in address array 202.

In some embodiments, control logic 112 can receive each of the k hashed values from the address array 202 and can use each hashed value to determine a corresponding bit address inside the Bloom filter 204. As previously described, when address array 202 is initiated, each bit is set to an initial value of 0. To insert an item into address array 202, the item is hashed, e.g., by hash unit 106, k number of times, k being the number of hashed values. The indexes, which result from the hash functions, can be used to determine or point to bit addresses in Bloom filter 204 and byte addresses in a register, for example, internal register 206. In some embodiments, internal register 206 may be a configurable register such as a vector extension register (e.g., AVX mm256 or mm512 register), as described with reference to FIG. 1.

Figure 3:
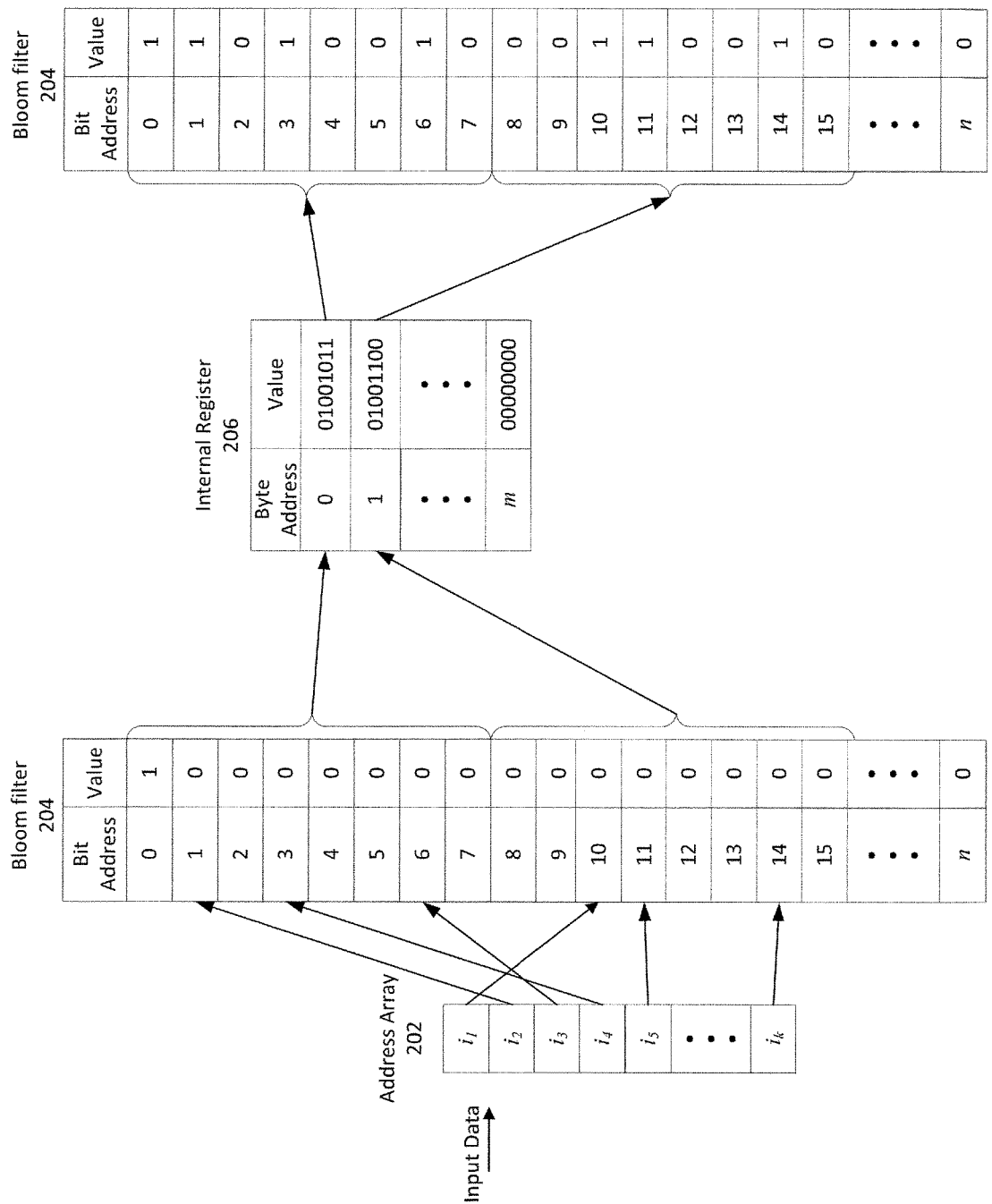
FIG. 3 illustrates an exemplary setting process of FIG. 2, consistent with some embodiments of the present disclosure.

FIG. 3 is an exemplary setting process in which address array 202 holds bit indexes $i_1$ through $i_k$. These values are determined based on hash unit 106 executing k hash functions on an input data item. In this example, the current state of Bloom filter 204 is such that bit address 0 has a value of 1 and bit addresses 1-$n$ have a value of 0 (although it is appreciated that some of the values can have a value of 1). For example, this state may occur mid-execution of a setting process. In some embodiments the generated indexes correspond to bit addresses in the Bloom filter 204. In another embodiment, control logic 112 may operate on the hashed values in address array 202, simultaneously or in tandem, to obtain corresponding byte addresses in internal register 206.

Internal register 206 may be configured to read the determined corresponding bit addresses from Bloom filter 204 and may be populated with m byte addresses. In some instances, multiple values in address array 202 point to the same byte address. In such instances, the bit address can be combined such that m<k and such that duplicate byte addresses are not read into internal register 206. For example, as shown in FIG. 3, both indexes $i_1$, $i_2$, and $i_3$ point to bit addresses 1, 3, and 6, respectively. Bit addresses 1, 3, and 6 all correspond to byte address 0 stored in internal register 206.

In some embodiments, byte addresses that do not correspond to an address, or index, in address array 202 may not be stored in internal register 206. For example, byte address 2 (corresponding to bit addresses 16-23 (not shown) of bloom filter 204) may not be pointed to by an address of address array 202. In such an implementation, internal register 206 would not store byte address 2.

Returning to FIG. 2, the m byte addresses, as described with reference to the example in FIG. 3, are read into an internal register 206, where m is less than or equal to k. For each of the byte addresses held in internal register 206, the corresponding bits from Bloom filter 204 may be written into internal register 206. In FIG. 3, address array 202 contains indexes mapping to one or more byte addresses (e.g., such as byte addresses 0 and 1 of internal register 206). For each of these byte addresses, internal register 206 may be updated to store the corresponding updated bits from Bloom filter 204. For example, for byte address 0, internal register 206 stores 01001011.

In some embodiments, Bloom filter 204 may be initiated with a value of 0 for each bit address. In other embodiments, as shown in FIG. 3, Bloom filter 204 may be populated with one or more bit addresses having a value of 1, e.g., such as bit address 0 having a value of 1. Control logic 112 may operate on the bits stored in Bloom filter 204 such that, for any existing bit addresses storing a value of 1, internal register 206 stores a value of 1, thereby not overwriting existing values.

The corresponding bit addresses of Bloom filter 204 are updated according to the values stored in each byte address of internal register 206. For example, internal register 206 stores a byte having a 1 for each bit address associated with indexes of address array 202. The values of the corresponding bit addresses in Bloom filter 204 are updated accordingly such that the bit addresses are populated with a 1 if: i) at its initial state, Bloom filter 204 contained a 1 for the bit address; or ii) if an index of address array 202 mapped to the bit address.

Figure 4:
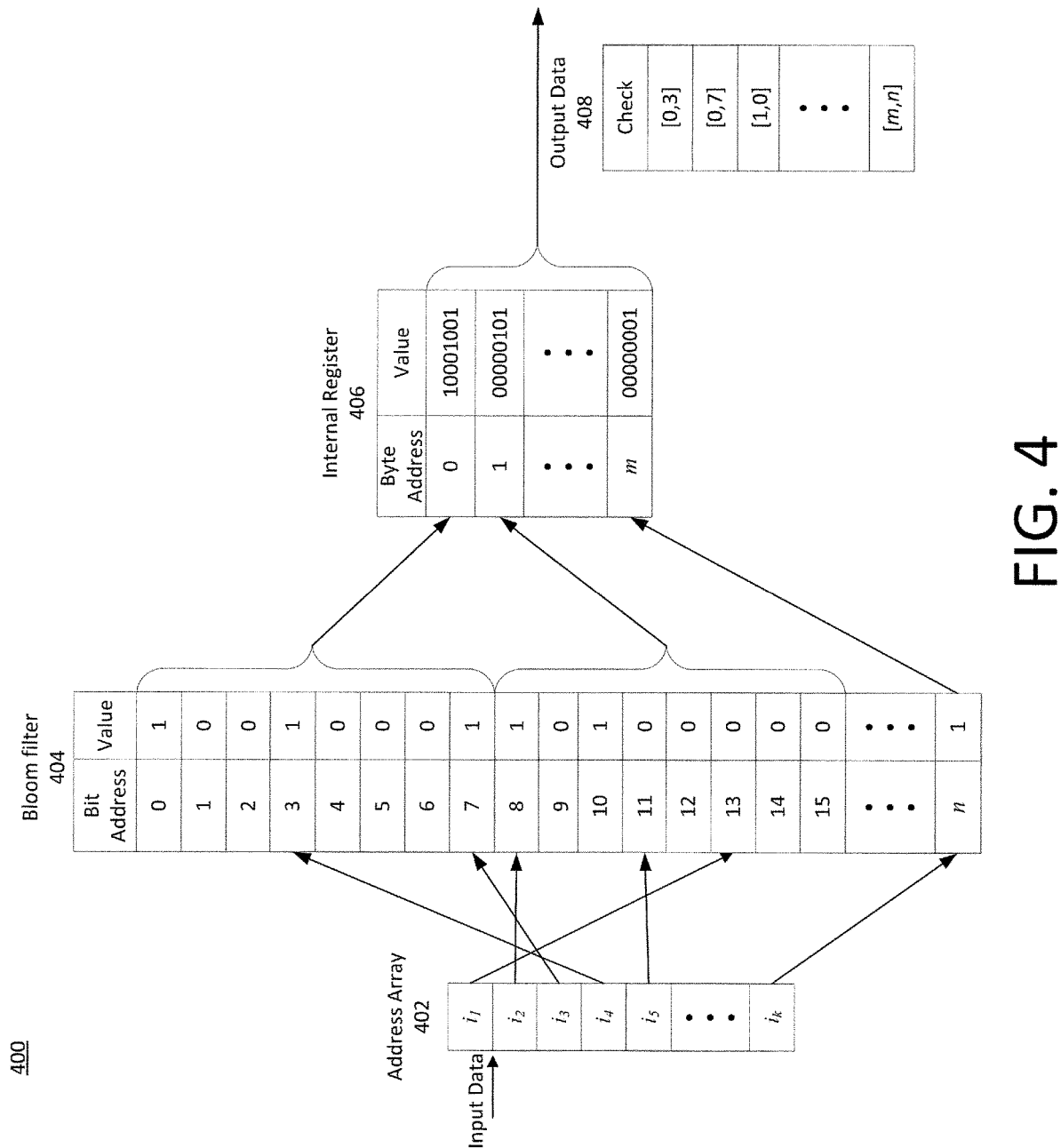
FIG. 4 illustrates an exemplary checking process for a Bloom filter, consistent with some embodiments of the present disclosure.

FIG. 4 illustrates an exemplary checking operation 400 using a system, e.g., system 100, consistent with some embodiments of the present disclosure.

In some embodiments, the control logic, e.g., control logic 112, may receive input data indicative of an item to check for in a Bloom filter. Hash unit 106 may perform k hash functions on the input data item, or search value, such that the number of hashes performed is the same as the number of hashes performed during the setting operation. In some embodiments, the value of k may be passed into control logic 112 as a sizing parameter that modifies the size of the address array or the size of the index.

Address array 402 stores the k hashed values. As previously described with reference to FIG. 2, the results of the hash functions are stored in address array 402. Control logic, e.g., control logic 112, may use each hash value as an index to determine corresponding bit addresses in Bloom filter 404. For each of the byte addresses held in internal register 406, the corresponding bits from Bloom filter 404 may be written into internal register 406. Thus, for byte address 0, internal register 406 may store 10001001 and for byte address 1, internal register 406 may store 00000101.

Because a CPU operates on bytes, the system 400 may fetch each database segment corresponding to the byte addresses stored in internal register 406. The system 400 may perform a bitwise AND operation to generate output data 408. For example, the system 400 may compare, for each byte address, the value stored in internal register 406 with the indexes of address array 402 to determine which indexes map to bit addresses having a value of 1. Thus, the output data 408 may include a listing of bit addresses per each byte addresses that may contain the search value.

For example, for each bit address associated with the hashed values of address array 402, the system 400 determines whether the value stored in Bloom filter 404 is 1, indicating the search value may be stored within the portion of a database segment associated with the bit address. The system 400 may then output a set of bit addresses to check for the search value. For example, address array 402 contains indexes corresponding to bit addresses 3 and 7, thus, system 400 may fetch the database segment associated with byte 0, which contains bits 3 and 7, and search the portions of the database segment associated with bit addresses 3 and 7 for the search term. In another example, output data 408 may indicate the search value may be stored in the portion of the database segment for byte address 1 associated with bit address 8, which may be written as bit address 0 of byte address 1.

The process described with reference to FIG. 4 can help with reducing the number of database queries required to locate the input data item to only those portions of database segments for bit addresses that correspond to the indexes of address array 402. Thus, the system may fetch segments associated with byte addresses of internal register 406, but only check those portions corresponding to the indexes of address array 402. In some embodiments, if each bit address of a byte address is zero, e.g., 00000000, the system does not need to fetch the database segment associated with the byte address because the item is not a member of the segment and the system may skip locating the item in memstore, therefore saving time processing the query.

Figure 5:
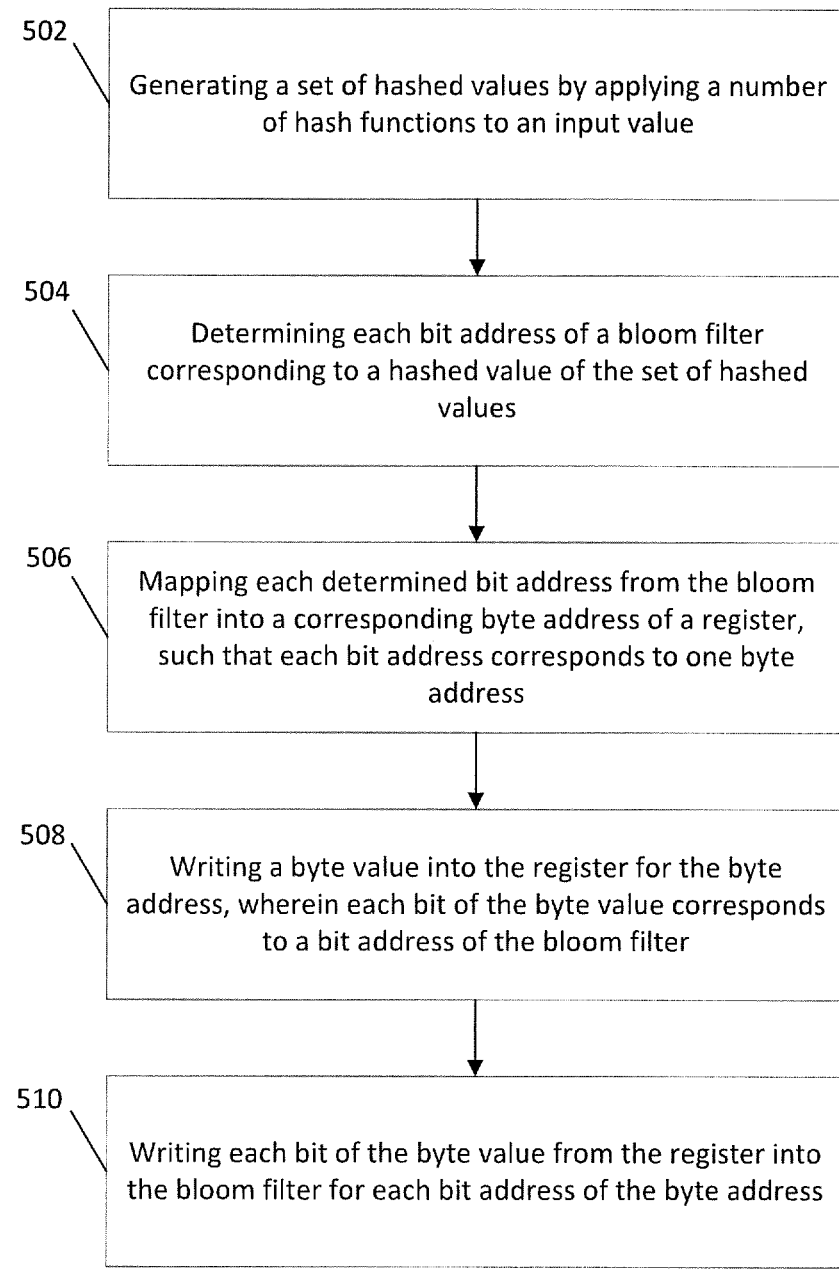
FIG. 5 illustrates a flowchart of an exemplary setting process, consistent with some embodiments of the present disclosure can be implemented.

FIG. 5 illustrates a flowchart of an exemplary setting operation 500, consistent with some embodiments of the present disclosure can be implemented. Setting operation 500 may be performed by a system 100 either alone or in parallel with other systems.

In some embodiments, one or more Bloom filter settings may be modified by a software program. For example, Bloom filter 204 may be configured to receive one or more parameters, e.g., a sizing parameter, where the value corresponds to a number of hash values corresponding to the set of hash values stored in the vector extension register or a size of the hash values stored in the extension register. For example, the sizing parameter may determine the size of the Bloom filter based on, for example, its intended application or the size of the database. These parameters may be passed to control logic 112, which uses the parameters to configure the Bloom filter.

At step 502, the system may generate a set of hashed values by applying a number of hash functions to an input value. The input value may be received, for example, via Data Bus In as part of an input data stream. The hashed values may be generated by hash unit 106 using one or more hash functions stored in hash key memory 108. In some embodiments, the number of hashed values to apply to the input value is based on the sizing parameter passed to the Bloom filter.

At step 504, the system may, as described with reference to FIGS. 2 and 3, determine each bit address of a Bloom filter corresponding to a hashed value of the set of hashed values. In some embodiments, the system may determine that certain bit addresses of the Bloom filter are populated with a 1. The system may map each determined bit address from the bloom filter into a corresponding byte address of a register, such that each bit addresses correspond to one byte address of the register, e.g., internal register 206 (step 506). For example, as shown in FIG. 3, there may be eight bit addresses that correspond to one byte address. In some embodiments, there may be less than eight bit addresses that correspond to one byte address.

At step 508, the system may update the register with a byte value for the byte address, wherein each bit of the byte value corresponds to a bit address of the Bloom filter. For example, the register may store a byte value containing eight bits where each bit represents one of eight bit addresses of the Bloom filter. In some embodiments, the register may store the byte as a hex value or in another format.

At step 510, the system may write each bit of the byte value from the register into the Bloom filter for each bit address of the byte address. For example, if the Bloom filter stored a 0 for a bit address 1, and the system received, in an address array, an index corresponding to bit address 1, the Bloom filter will be updated such that bit address 1 stores a value of 1.

Figure 6:
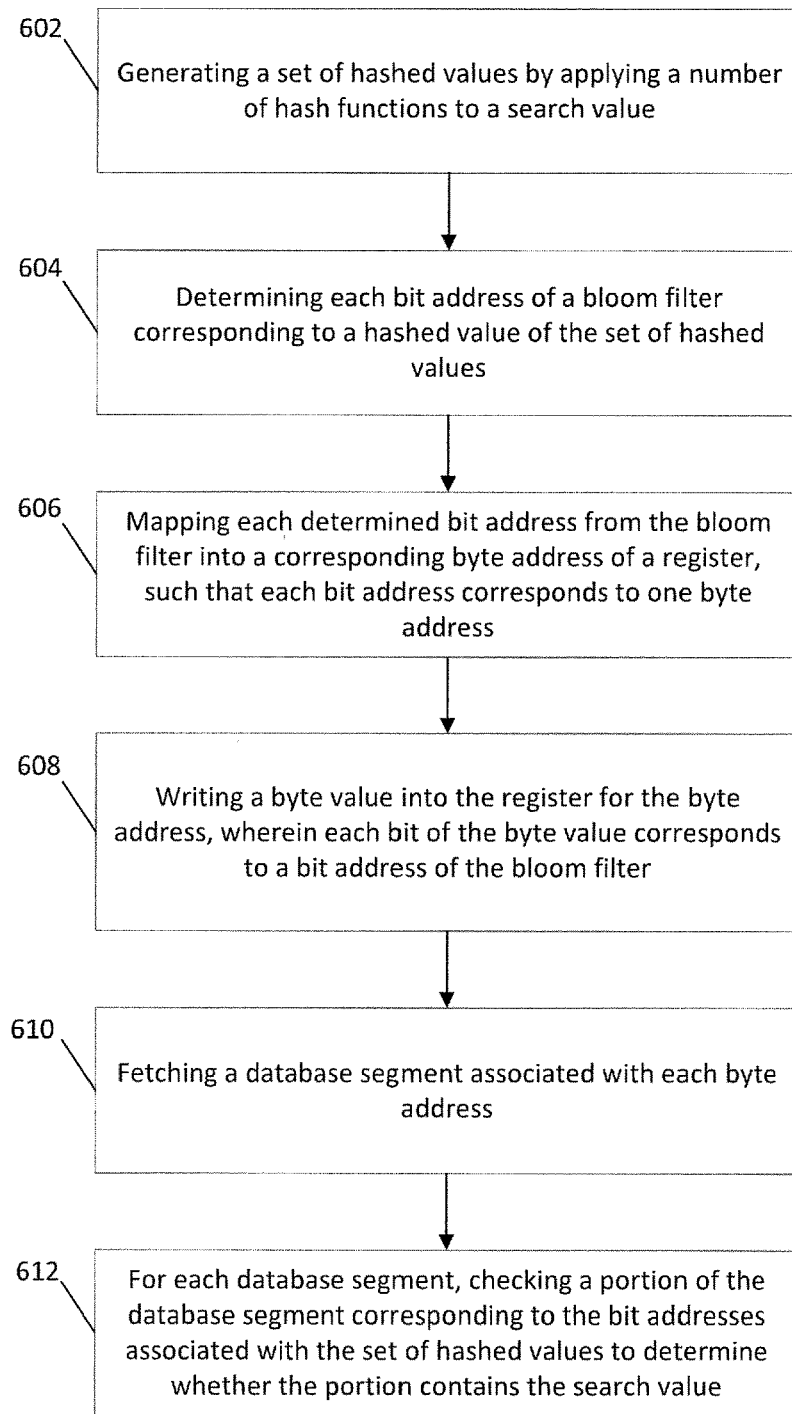
FIG. 6 illustrates a flowchart of an exemplary checking process, consistent with some embodiments of the present disclosure can be implemented

FIG. 6 illustrates a flowchart of an exemplary checking operation 600, consistent with some embodiments of the present disclosure can be implemented. Checking operation 600 may be performed by a system 100 either alone or in parallel with other systems.

At step 602, the system may generate a set of hashed values by applying a number of hash functions to a search value. The number of hash functions may be determined based on the number of hash functions used in the setting operation. The system may receive a search value, for example, via Data Bus In. The search value may be an item that an application wishes to search for within one or more databases. The system may apply the hash functions to the search value to determine a number of hashed values.

At step 604, the system may determine each bit address of a Bloom filter corresponding to a hashed value of the set of hashed values. At step 606, the system may map each determined bit address from the bloom filter into a corresponding byte address of a register, such that each bit address corresponds to one byte address. For example, as shown in FIG. 4, there may be eight bit addresses that correspond to one byte address. In some embodiments, there may be less than eight bit addresses that correspond to one byte address.

As described with reference to FIG. 4, at step 608, the system may write a byte value into the register for the byte address, wherein each bit of the byte value corresponds to a bit address of the bloom filter.

At step 610, the system may fetch a database segment associated with each byte address. To determine whether a database segment contains the search term, at step 612, the system may, for each database segment, checking a portion of the database segment corresponding to the bit addresses associated with the set of hashed values to determine whether the portion contains the search value. For example, the system may perform a bitwise AND to determine which bit addresses associated the set of hashed values store a value of 1 in the Bloom filter.

In some embodiments, the system may generate an output stream including a subset of bit addresses corresponding to bytes of the register having a value of 1 and corresponding to the indexes of the address array. In some embodiments the system may apply a multiplexer to the output stream if the checking operation is executed by a number of systems in parallel. Based on this set of bit addresses for each byte address, the system may query the portions of the database segments associated with those bit addresses indicated by the register.

The various example embodiments described herein can include aspects performed by computer program product, embodied in a computer-readable medium, including computer-executable instructions, such as program code, executed by computers in networked environments. For example, the configuring of a register having an address array (e.g., address array 202 of FIG. 2) can be performed via a computer program product. The configuring may involve setting the number of hash values for a given input or setting the size of the hash value. A computer-readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. The computer-readable medium can be a tangible and non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer-implemented method comprising:
generating a set of hashed values by applying a number of hash functions to an input value;
determining each bit address of a bloom filter corresponding to a hashed value of the set of hashed values;
mapping each determined bit address from the bloom filter into a corresponding byte address of a register, such that each bit address corresponds to one byte address;
writing a byte value into the register for the byte address, wherein each bit of the byte value corresponds to a bit address of the bloom filter; and
writing each bit of the byte value from the register into the bloom filter for each bit address of the byte address.

2. The method of claim 1, further comprising performing a bitwise AND on the bits of each byte value.

3. The method of claim 1, wherein the bloom filter is stored in memory of a processor.

4. The method of claim 1, wherein the generated set of hashed values are stored in a vector extension register.

5. The method of claim 4, further comprising:
receiving a value for configuring the vector extension register, wherein the value corresponds to at least one of a number of hash values corresponding to the set of hash values stored in the vector extension register or a size of the hash values stored in the vector extension register.

6. The method of claim 1, wherein a number of hash values in the set of hash values is greater than a number of bit addresses of the determined bit addresses.

7. A computer-implemented method comprising:
generating a set of hashed values by applying a number of hash functions to a search value;
determining each bit address of a bloom filter corresponding to a hashed value of the set of hashed values;

mapping each determined bit address from the bloom filter into a corresponding byte address of a register, such that each bit address corresponds to one byte address;

writing a byte value into the register for the byte address, wherein each bit of the byte value corresponds to a bit address of the bloom filter;

fetching a database segment associated with each byte address; and for each database segment, checking a portion of the database segment corresponding to the bit addresses associated with the set of hashed values to determine whether the portion contains the search value.

8. The method of claim 7, wherein the bloom filter is stored in memory of a processor.

9. The method of claim 7, wherein the generated set of hashed values are stored in a vector extension register.

10. The method of claim 9, further comprising:

receiving a value for configuring the vector extension register, wherein the value corresponds to at least one of a number of hash values corresponding to the set of hash values stored in the vector extension register or a size of the hash values stored in the vector extension register.

11. The method of claim 7, further comprising querying a segment of a database for the search value if the output is 1.

12. A system comprising:

a memory configured to store a bloom filter having bit addresses and corresponding bit values;

a configurable register configured to store a set of hash values that are generated by applying a number of hash functions to an input value, wherein the set of hash values are used to determine corresponding bit addresses of the bloom filter and wherein the configurable register is configured to read the determined corresponding bit addresses from the bloom filter and store byte values, wherein each bit of the byte values corresponds to a bit address of the bloom filter, wherein the configurable register is configured based on a received value, wherein the received value corresponds to at least one of a number of hash values corresponding to the set of hash values stored in the configurable register or of a size of the hash values stored in the configurable register.

13. The system of claim 12, wherein the configurable register is further configured to output a data stream comprising a result of a bitwise AND performed on the bits of each byte value.

14. The system of claim 12, wherein the configurable register is a vector extension register.

* * * * *